(No Model.) 2 Sheets—Sheet 1.

M. M. BALDWIN.
POTATO DIGGER.

No. 596,647. Patented Jan. 4, 1898.

Witnesses
Jas. H. McCathran
U. B. Hillyard.

Inventor
Moses M. Baldwin
By his Attorneys,
C. A. Snow & Co.

(No Model.) 2 Sheets—Sheet 2.

M. M. BALDWIN.
POTATO DIGGER.

No. 596,647. Patented Jan. 4, 1898.

Witnesses
Jas. K. McCuthran
V. B. Hillyard.

Inventor
Moses M. Baldwin
By his Attorneys,
C. A. Snow & Co.

UNITED STATES PATENT OFFICE.

MOSES M. BALDWIN, OF COLORADO SPRINGS, COLORADO.

POTATO-DIGGER.

SPECIFICATION forming part of Letters Patent No. 596,647, dated January 4, 1898.

Application filed December 16, 1896. Serial No. 615,871. (No model.)

*To all whom it may concern:*

Be it known that I, MOSES M. BALDWIN, a citizen of the United States, residing at Colorado Springs, in the county of El Paso and State of Colorado, have invented a new and useful Potato-Digger, of which the following is a specification.

This invention relates to mechanical appliances for excavating and separating potatoes and other subsoil-growing edibles, and aims to supply a machine which will perform the required work in a rapid and effective manner without injury to the vegetables and which will thoroughly loosen and remove all adhering soil and deposit the potatoes either in a row upon the top of the ground or in a receptacle, as required.

In its organization the machine comprises a plow for excavating the potatoes, revolving screens for loosening and separating the soil, a tail-screen supplementing the action of the revolving screens, wings attached to the inner side of the revolving screens to deflect the potatoes onto the tail-screen, and an operating-lever under the control of the driver for simultaneously raising and lowering the plow and the tail-screen, all as will appear more fully hereinafter.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
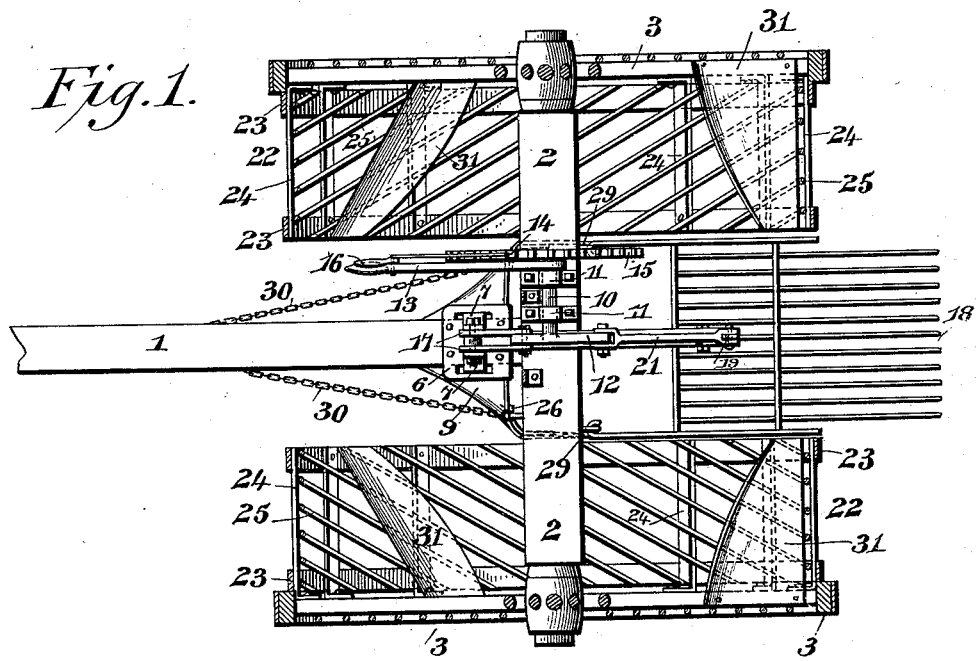
Figure 6:
Figure 3:
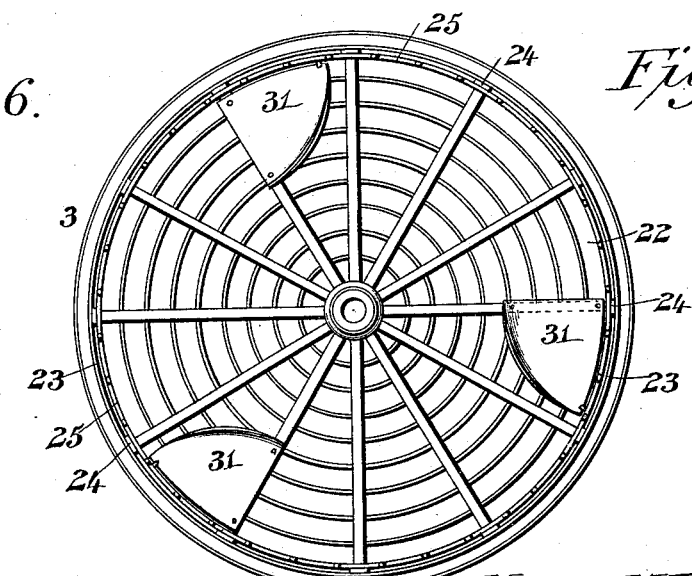
Figure 2:
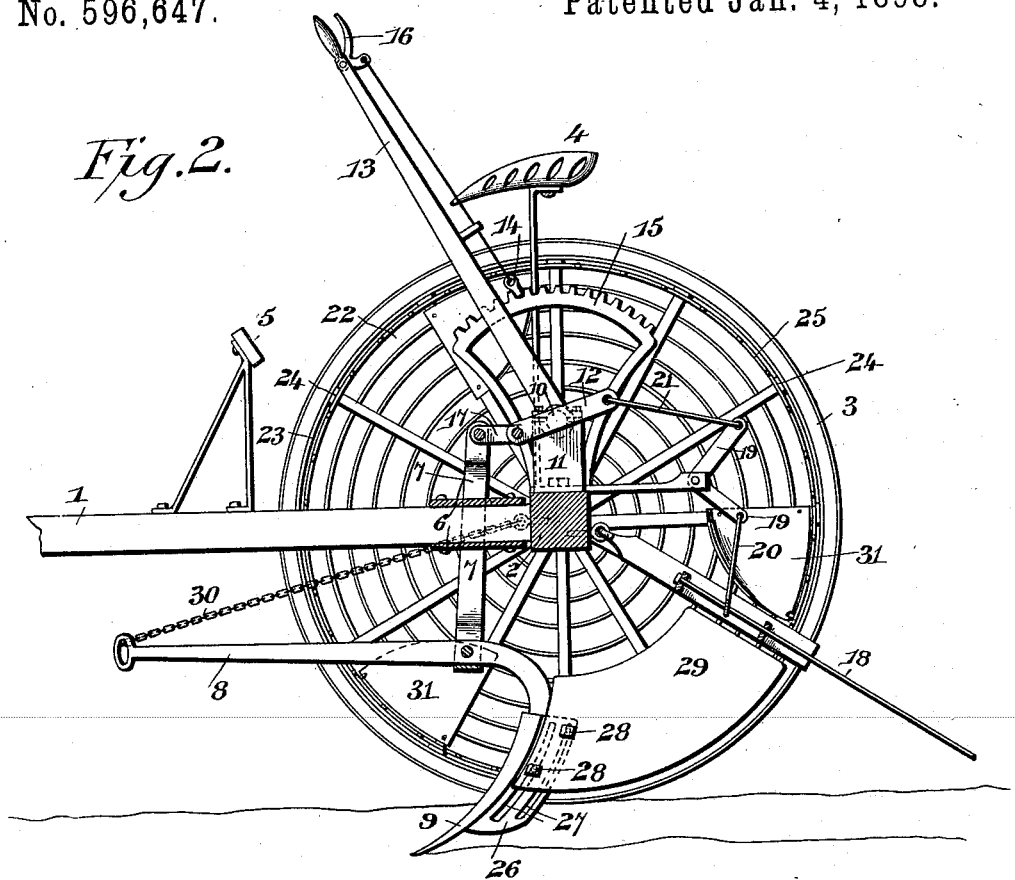
Figure 4:
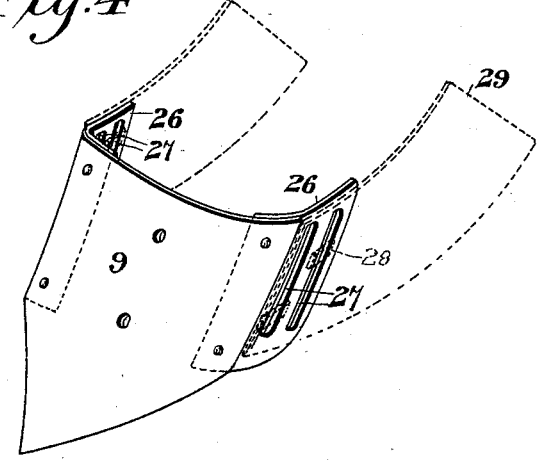
Figure 5:
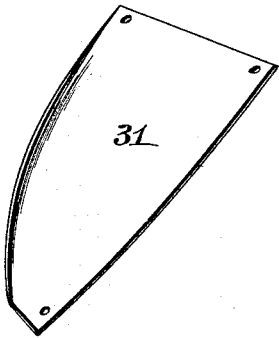

Figure 1 is a top plan view of a potato-digger constructed in accordance with this invention, the supporting-wheel and revolving screens being shown in section. Fig. 2 is a vertical longitudinal section thereof. Fig. 3 is a side elevation of a supporting-wheel, showing the screen attached thereto. Fig. 4 is a detail view of the plow, showing by dotted lines the guards adjustably connected therewith. Fig. 5 is a detail view of a wing which is secured to the inner side of a revolving screen. Fig. 6 is a detail view of the stirrup or link supporting the plow.

Corresponding and like parts are referred to in the following description and indicated in all the views of the accompanying drawings by the same reference-characters.

The pole or tongue 1 is secured at its rear end to the axle 2, upon which are loosely mounted the ground or supporting wheels 3, the latter being of ordinary construction. The driver's seat 4 is secured to the upper end of a standard, which is made fast at its lower end to the axle 2, and a foot-rest 5 is applied to the pole or tongue in advance of the seat within convenient reach thereof. Metal plates 6 are secured to the top and bottom sides of the pole and their end portions project beyond the opposite sides of the pole and have openings vertically alining, through which the side members of a stirrup 7 pass, said stirrup carrying a beam 8, to which a plow 9 of desired construction is applied. A shaft 10 is journaled in bearings 11, secured to the axle 2, and a cross-bar 12 is applied to or formed with one end of the shaft 10, and an operating-lever 13 is secured to the opposite end of the said shaft and is supplied with a latch 14 to engage with a notched segment 15 to hold the lever 13 in an adjusted position, said latch 14 having connection with a hand-latch 16 in the usual way. Links 17 connect the upper end of the stirrup 7 with the front end of the cross-bar 12, whereby upon operating the lever 13 the plow may be raised or lowered, as desired. A tail-screen 18, of suitable formation, has pivotal connection at its front end with the axle 2 and is connected with one arm of a bell-crank lever 19 by means of a link 20, and a link 21 connects the opposite arm of the bell-crank lever with the rear end of the cross-bar 12.

From the foregoing construction it will be seen that the tail-screen and plow are simultaneously operated by means of the lever 13 and are held in a relative adjusted position by the means employed for securing the lever when adjusted. The tail-screen normally inclines rearwardly and downwardly and is centrally disposed with respect to the axle and ground-wheels.

Revolving screens 22 are attached to the inner side of the ground-wheels 3 and rotate therewith and are closed at their outer end and open at their inner end and have their open ends about in the plane of the sides or edges of the plow 9, so that the potatoes excavated by the plow will be deflected laterally into the screens. Each revolving screen is composed of inner and outer bands 23, transverse bars 24, secured at their ends to bands 23 and at their outer ends to the spokes of the ground-wheel, and oblique rods 25, secured in any convenient manner to the bands 23 and bars 24.

The plow 9, as previously intimated, may be of any required pattern and has wings 26 secured to the edges or sides thereof, the rear portions of the wings extending parallel and being provided with parallel slots 27, in which operate fastenings 28 to secure guards 29 adjustably thereto. These guards 29 close the space formed between the plow and the tail-screen and retain the potatoes within the revolving screens until they reach the tail-screen, upon which they are delivered. Inasmuch as the plow will have its elevation changed according to the depth of the potatoes to be excavated the advantage of adjustably connecting the guards 29 therewith will be apparent; otherwise if the plow were raised a space would intervene between the lower edge of the guards and the inner side of the screen, which would admit of the escape of some of the potatoes. The style of plow 9 will depend upon the nature and condition of the soil and that found best adapted for the work in hand will be selected.

Stay-chains 30 are interposed between the front end of the beam 8 and the axle 2 and inclined rearwardly in opposite directions to steady and fix the position of the plow, so as to prevent lateral movement thereof. The potatoes are directed from the revolving screens onto the tail-screen 18 by means of wings or blades 31, which are located at intervals in the circumferential length of the screens and are obliquely disposed and are partially twisted, thereby attaining the best possible results.

As the machine is drawn over the field the plow 9 penetrates the soil to the requisite depth and excavates the potatoes, and by reason of its construction directs them laterally into the revolving screens, which latter loosen and separate the soil adhering thereto, and the wings or blades 31, engaging with the potatoes, elevate them to the tail-screen, upon which they are delivered, the guards 29 serving to prevent the escape of the potatoes in their ascent to the tail-screens and the outer closed ends of the screens preventing the escape of the potatoes through the spokes of the ground-wheels.

Having thus described the invention, what is claimed as new is—

1. In a potato-digger, the combination of a plow, a revolving screen, a tail-screen, and a guard attached to and movable with the plow and extending between it and the tail-screen, substantially as and for the purpose set forth.

2. In a potato-digger, the combination of a vertically-adjustable plow, a revolving screen, a tail-screen, and a guard interposed between the plow and tail-screen, and having adjustable connection with the plow, substantially as and for the purpose set forth.

3. In a potato-digger, the combination of a vertically-adjustable plow, having a rearwardly-extending wing formed with approximately vertical slots, a revolving screen, a tail-screen, and a guard interposed between the plow and tail-screen and having adjustable connection with the slotted wing of the plow, substantially as set forth for the purpose described.

4. In a potato-digger, the combination of a vertically-adjustable plow, a tail-screen, a shaft provided with an operating-lever and having a cross-bar, a stirrup having connection with the plow, links connecting the upper end of the stirrup with the front end of the cross-bar, a bell-crank lever, and links connecting the arms of the bell-crank lever with, respectively, the rear end of the aforesaid cross-bar and with the tail-screen, substantially as set forth.

5. In a potato-digger, the combination of a plow, a tail-screen, revolving screens placed upon opposite sides of the plow and tail-screen, wings or blades applied to the inner side of the revolving screens in oblique relation and having a partial twist, and adapted to elevate the potatoes and discharge them laterally onto the tail-screen, and guards located wholly in the rear of the plow and extending between it and the tail-screen, substantially as shown for the purpose specified.

6. The herein-described potato-digger, comprising a vertically-adjustable plow, a tail-screen, an operating-lever having connection with the plow and tail-screen for simultaneously adjusting both, revolving screens located upon opposite sides of the plow, wings or blades secured to the inner sides of the revolving screens for elevating the potatoes and directing them onto the tail-screen, and guards interposed between the plow and tail-screen, and having direct adjustable connection with the plow, substantially as and for the purpose set forth.

In testimony that I claim the foregoing as my own I have hereto affixed my signature in the presence of two witnesses.

MOSES M. BALDWIN.

Witnesses:
A. C. SLOAN,
E. H. HUTCHINS.